(12) United States Patent
Kim

(10) Patent No.: US 9,903,467 B2
(45) Date of Patent: Feb. 27, 2018

(54) ELECTRONIC SHIFT SYSTEM

(71) Applicant: Hyundai Motor Company, Seoul (KR)

(72) Inventor: Eun Sik Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 34 days.

(21) Appl. No.: 15/046,807

(22) Filed: Feb. 18, 2016

(65) Prior Publication Data

US 2017/0108116 A1 Apr. 20, 2017

(51) Int. Cl.
*G06F 7/00* (2006.01)
*F16H 59/02* (2006.01)
*F16H 59/10* (2006.01)
*F16H 61/22* (2006.01)

(52) U.S. Cl.
CPC ..... *F16H 59/0278* (2013.01); *F16H 59/0217* (2013.01); *F16H 59/105* (2013.01); *F16H 61/22* (2013.01); *F16H 2059/0282* (2013.01)

(58) Field of Classification Search
CPC .. F16H 59/0278; F16H 59/0217; F16H 61/22; F16H 59/105; F16H 2059/0282
See application file for complete search history.

(56) References Cited

U.S. PATENT DOCUMENTS

| | | | | |
|---|---|---|---|---|
| 6,145,401 A | * | 11/2000 | Brush | F16H 59/02 74/473.12 |
| 2008/0078604 A1 | * | 4/2008 | Ersoy | F16H 59/044 180/336 |
| 2012/0085193 A1 | * | 4/2012 | Heo | F16H 59/04 74/473.18 |
| 2012/0316030 A1 | * | 12/2012 | Choi | B60R 25/24 477/99 |
| 2015/0025761 A1 | * | 1/2015 | Kernebeck | G01D 5/145 701/60 |
| 2015/0251534 A1 | * | 9/2015 | Kim | B60K 20/08 180/333 |
| 2016/0245402 A1 | * | 8/2016 | Fribus | B60R 25/252 |

FOREIGN PATENT DOCUMENTS

| | | |
|---|---|---|
| EP | 1 342 938 A2 | 9/2003 |
| JP | 2011-505294 A | 2/2011 |
| JP | 2013-002619 A | 1/2013 |
| JP | 2014-118067 A | 6/2014 |
| KR | 10-2010-0123150 | 11/2010 |
| KR | 10-2012-0064260 A | 6/2012 |
| KR | 10-1399087 B1 | 5/2014 |
| KR | 10-2015-0002106 | 1/2015 |

* cited by examiner

*Primary Examiner* — David J Hlavka
(74) *Attorney, Agent, or Firm* — Mintz Levin Cohn Ferris Glovsky and Popeo, P.C.; Peter F. Corless

(57) ABSTRACT

A button-type electronic shift system is provided. The electronic shift system executes a gear-changing operation to a target shift position by the rotation and the forward movement of a shift lever.

17 Claims, 6 Drawing Sheets

ELECTRONIC SHIFT SYSTEM

CROSS REFERENCE TO RELATED APPLICATION

The present application claims priority to Korean Patent Application No. 10-2015-0140198, filed Oct. 6, 2015, the entire contents of which is incorporated herein for all purposes by this reference.

BACKGROUND

Field of the Invention

The present invention generally relates to a button-type electronic shift system, and more particularly, to an electronic shift system that executes a gear-changing operation to a target shift position by the rotation and forward movement of a shift lever.

Description of the Related Art

Generally, in a vehicle equipped with an automatic transmission, hydraulic pressure is adjusted within a preset shifting range based on a cruising speed of the vehicle to allow transmission gears in the range of a target shift position to operate automatically. The automatic transmission generates gear ratios using a hydraulic circuit, a planetary gear train, and friction elements to change gears, and a transmission control unit (TCU) is configured to operate these components.

A shift by wire (SBW) system, which is a vehicle electronic shift system, does not have a mechanical connecting structure, such as a cable, between a transmission and a shift lever unlike mechanical shift systems of the related art. When a sensor value generated in response to the manipulation of an electronic shift lever or button is transferred to the TCU, a solenoid or an electric motor operates in response to an electric signal instructed by the TCU. The operation of the solenoid or the electric motor allows hydraulic pressure to be induced in a hydraulic circuit of each shift position or prevents hydraulic pressure from being induced in the same.

Thus, an automatic transmission based on the SBW transfers a gear-changing intention of the driver in the form of an electrical signal to the TCU in response to the electronic shift lever or button being operated, whereby a gear-changing operation to a driving (D) position, a reversing (R) position, a neutral (N) position, a parking (P) position, or the like may be advantageously facilitated. Since the size of the shift lever may be reduced, a relatively-large space may be advantageously obtained between the driver's seat and the adjacent passenger seat.

Gear-changing systems allowing the driver to change gears using the electronic shift system generally include a lever-type gear-changing system and a button-type gear-changing system. The lever-type gear-changing system is similar to a mechanical shift lever of the related art, which is moved in a forward-backward direction to change gears. In the button-type gear-changing system, a gear-changing operation is performed by pressing or engaging buttons each set to a specific shift position.

However, the above-mentioned lever-type or button-type electronic shift system of the related art has a drawback in that a driver may find the simple gear-changing operation unstimulating. This disadvantageously fails to improve the marketability of the electronic shift system. In addition, the lever-type or button-type electronic shift system of the related art has low reliability, since the gear-changing operation is performed by a single manipulation. Consequently, the possibility of an erroneous manipulation increases.

The foregoing is intended merely to aid in the understanding of the background of the present invention, and is not intended to mean that the present invention falls within the purview of the related art that is already known to those skilled in the art.

SUMMARY

Accordingly, the present invention provides an electronic shift system that executes a gear-changing operation to a target shift position by the rotation and the forward movement of a shift lever. The electronic shift system may stimulate a driver's interest in the gear-changing operation, thereby improving the marketability thereof. In particular, the reliability of the gear-changing operation may be improved, thereby preventing an erroneous manipulation.

According to one aspect of the present invention, an electronic shift system may include a shift lever, wherein an upper end of the shift lever is movable in a transverse direction with respect to a lower end thereof, or an entire body of the shift lever is movable forwards or backwards with respect to the lower end thereof; a lever magnet engaged with the lower end of the shift lever; a first actuator connected to the shift lever to restrain the shift lever to prevent the shift lever from rotating transversely or to release the shift lever from a restrained position; a second actuator connected to the shift lever to restrain the shift lever to prevent the shift lever from moving forwards or backwards or to release the shift lever from a restrained position; and a printed circuit board (PCB) facing the lever magnet, wherein the PCB may be configured to detect shift positions in response to changes in a position of the lever magnet, output a shift position signal of a detected shift position to a transmission control unit (TCU), and operate the first actuator and an operation of the second actuators.

The electronic shift system may further include a rotating button disposed on an upper portion of the shift lever, wherein the rotating button may be configured to output a transverse rotation signal of the shift lever in a case of electrical connection by being manipulated by a driver. The shift positions selected when the shift lever rotates in response to the rotating button being manipulated may include a parking position, a reversing position, a neutral position, and a driving position. The rotating button may include a forward button configured to generate a signal to rotate the shift lever in which the shift positions are selected in the order of the parking position, the reversing position, the neutral position, and the driving position and a reverse button configured to generate a signal to rotate the shift lever in which the shift positions are selected in the order of the driving position, the neutral position, the reversing position, and the parking position.

The electronic shift system may further include a forward button disposed on the upper portion of the shift lever, wherein the forward button may be configured to output a forward movement signal of the shift lever in a case of electrical connection by being manipulated by the driver. The position of the lever magnet may change following rotation of the shift lever in response to the rotating button being manipulated and the PCB may be configured to detect a selected shift position based on a value of current that corresponds to a change in magnetic flux. When the position of the lever magnet may change following the forward movement of the shift lever in response to manipulation of the forward button after manipulation of the rotating button is stopped, the PCB may be configured to output a selected shift position change signal to the TCU using a value of current that corresponds to a change in magnetic flux.

The shift lever may be disposed on a console adjacent to a driver's seat to allow ease of manipulation of the shift lever, an upper part of the shift lever that protrudes into an interior of a cabin through the console, a lower part of the shift lever being disposed to be positioned within the console. The console may have a manipulation aperture, wherein the shift lever rotates and moves forwards and backwards within the manipulation aperture without interfering with the shift lever. The electronic shift system may further include a cover member that covers the manipulation aperture. The cover member may be disposed on the console in a position in which the cover member is guided thereto or may be magnetically engaged with the console in which the cover member may move together with the shift lever.

Further, the console may include a support plate fixedly disposed therein, and the first and second actuators and the PCB may be fixedly disposed on the support plate. The electronic shift system may further include a lever rod that extends in a forward-backward direction through the lower end portion of the shift lever. The lever rod may be engaged integrally with the shift lever to operate in conjunction with the shift lever, and may be connected to the first and second actuators.

The electronic shift system may further include a return spring, wherein a leading end portion of the lever rod extends through the return spring. Additionally, one end (e.g., a first end) of the return spring may be supported by the lever rod, and the other end (e.g., a second end) of the return spring may be disposed on and supported by a front surface of the support plate. When external force applied to the lever rod from the shift lever is removed, the return spring may return the lever rod to an original position by driving the lever rod backwards. A portion of the lever rod that extends through the first actuator may form a rotor part on which permanent S magnets and permanent N magnets are fixedly disposed. The first actuator may include a stator part on which coils may be wound. The rotor part and the stator part may constitute a step motor.

Magnetic strengths of the rotor part may be changed differently based on the shift positions or the distances between the rotor part and the stator part may be set different based on the shift positions, thereby setting different levels of resistance of the step motor based on the shift positions, thus imparting a control feeling to the driver when changing gears. The second actuator may include a solenoid. When an electrical connection may be made in response to the driver manipulating the forward button, the supply of current to the solenoid may be stopped, and thus the lever rod may be in a released position in which the lever rod is movable forwards. When the forward button is no longer manipulated, current may be applied to the solenoid, and the lever rod may be restrained to prevent the lever rod from moving forwards.

When both the rotating button and the forward button are in off positions (e.g., disengaged), both the first and second actuators may remain in locked positions under control of the PCB, whereby both the rotation and the forward movement of the shift lever may be restrained. When the rotating button is in an on position (e.g., engaged) and the forward button is in an off position (e.g., disengaged), the first actuator may be operated by the PCB to rotate the shift lever and maintain the second actuator in a locked position, and thus the forward movement of the shift lever may be restrained.

When the rotating button is in an off position and the forward button is in an on position, the first actuator may be configured to restrain the rotation of the shift lever by remaining in a locked position under control of the PCB, and the second actuator may be disposed in a released position in response to supply of current being stopped, thus allowing the shift lever to move forwards. When both the rotating button and the forward button are in on positions, the PCB may be configured to determine this situation to be an erroneous manipulation, and may be configured to operate both the first actuator and the second actuator to be locked. The electronic shift system may further include a display part configured to display a warning signal based on a current shift position and an error signal output from the PCB.

The electronic shift system according to the exemplary embodiment of the present invention executes a gear-changing operation to a target shift position by the rotation and the forward movement of the shift lever. The electronic shift system may stimulate a driver's interest in the gear-changing operation, thereby improving the marketability thereof. In particular, the reliability of the gear-changing operation may be improved, thereby preventing an erroneous manipulation.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
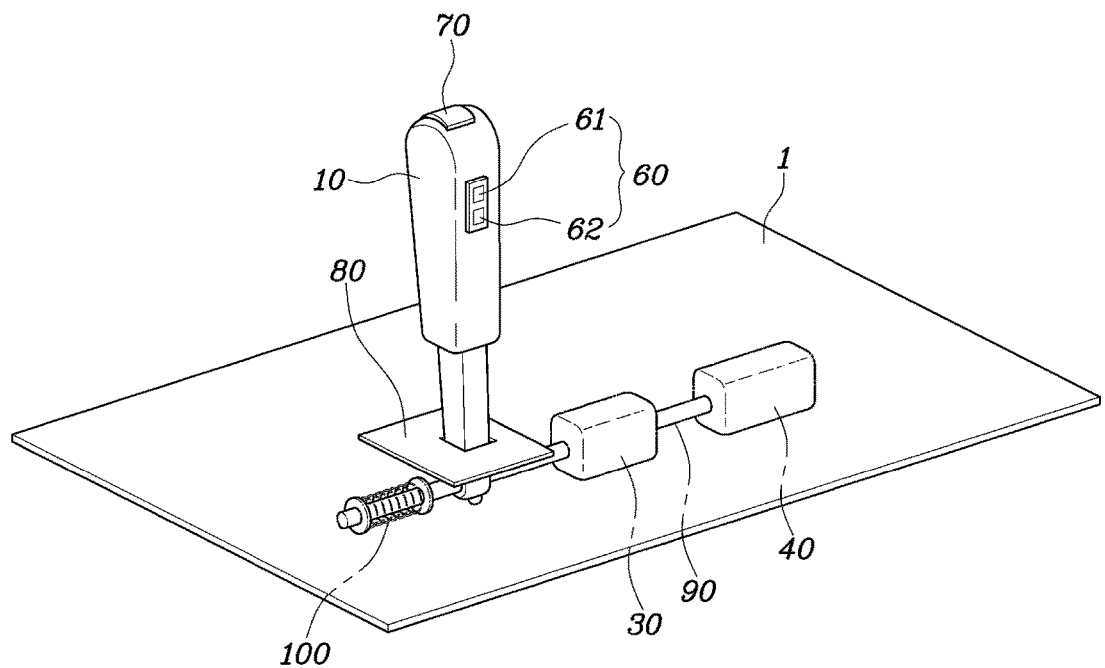
FIG. 1 is a view illustrating an electronic shift system according to an exemplary embodiment of the present invention.
Figure 2:
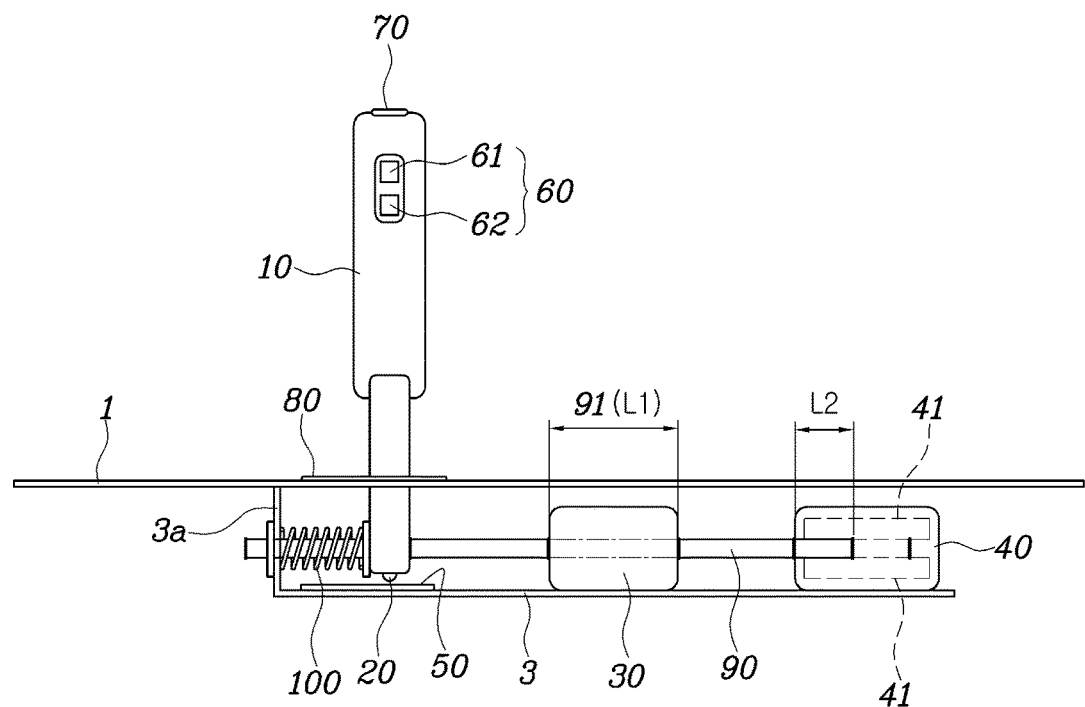
FIGS. 2 and 3 are side elevation and detailed views of the electronic shift system shown in FIG. 1 according to an exemplary embodiment of the present invention.
Figure 3:
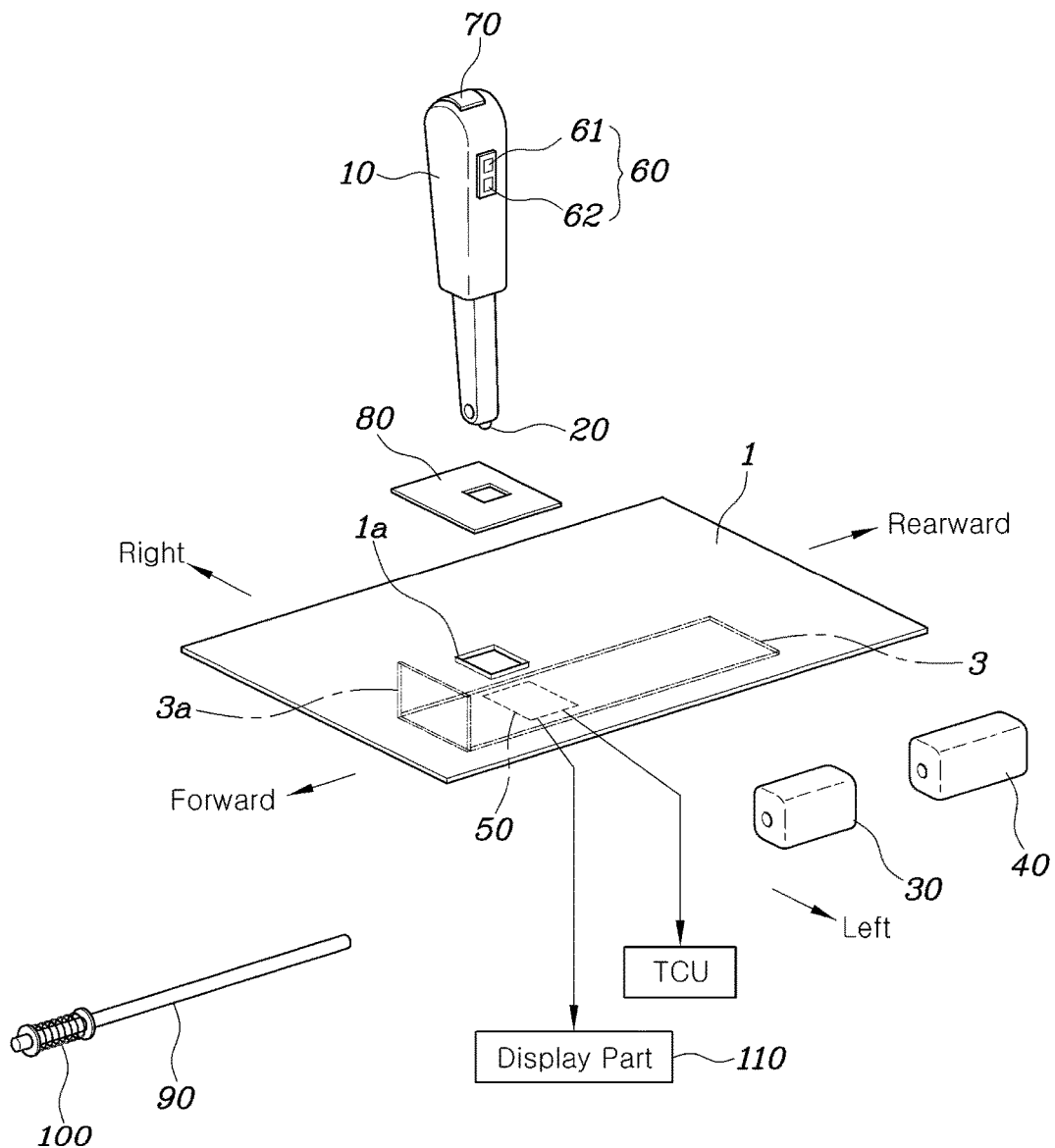

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in greater detail to an electronic shift system according to an exemplary embodiment of the present invention in conjunction with the accompanying drawings.

As illustrated in FIGS. 1 to 6, the electronic shift system according to the exemplary embodiment of the present invention may include a shift lever 10, a lever magnet 20, a first actuator 30, a second actuator 40, and a printed circuit board (PCB) 50. The PCB 50 may include a controller configured to operate the first and the second actuator 40.

In particular, the upper end of the shift lever 10 may move in the transverse direction with respect to the lower end thereof, or the entire body thereof may be moved forwards or backwards with respect to the lower end thereof. The lever magnet 20 may be engaged with the lower end of the shift lever 10. The first actuator 30 may be connected to the shift lever 10 to restrain the shift lever 10 and prevent the shift lever 10 from rotating transversely or release the shift lever 10 from the restrained position. The second actuator 40 may be connected to the shift lever 10 to restrain the shift lever 10 and prevent the shift lever 10 from moving forwards or backwards or to release the shift lever 10 from the restrained position. The PCB 50 may be disposed to face the lever magnet 20 and may be configured to detect shift positions, such as P, R, N, and D positions, in response to changes in the position of the lever magnet 20, to output a shift position signal of the detected shift position to a transmission control unit (TCU), and to operate the first and second actuators.

When a gear change signal is output from the PCB 50, the signal may be transferred to the TCU. A solenoid or an electric motor may be configured to operate in response to an electric signal transmitted by the TCU. The operation of the solenoid or the electric motor allows hydraulic pressure to be induced in a hydraulic circuit of each shift position or may prevent hydraulic pressure from being induced in the same, whereby shift control may be performed electronically.

In addition, the electronic shift system according to the exemplary embodiment of the present invention may further include a rotating button 60 and a forward button 70. The rotating button 60 may be disposed on the upper portion of the shift lever 10, and may be configured to output a transverse rotation signal of the shift lever 10 in the case of electrical connection due to the manipulation of the button. The forward button 70 may be disposed on the upper portion of the shift lever 10, and may be configured to output a forward movement signal of the shift lever 10 in the case of electrical connection due to the manipulation of the button.

The rotating button 60 and the forward button 70 may be disposed in different positions of the upper portion of the shift lever 10 to prevent the rotating button 60 and the forward button 70 from being erroneously manipulated. In this regard, the rotating button 60 may be disposed on one surface of the upper portion of the shift lever 10 (e.g., on a longitudinal side surface of the shift lever 10) and the forward button 70 may be disposed on an upper surface of the upper portion of the shift lever 10 (e.g., on a top surface of the shift lever 10). However, the present invention is not limited thereto and the buttons may be disposed on other locations of the shift lever 10.

Furthermore, the different shift positions selected when the shift lever 10 rotates in response to the rotating button 60 being manipulated include a park (P) position, a reverse R̂ position, a neutral (N) position, and a drive (D) position. The rotating button 60 may include a forward button 61 and a reverse button 62. The forward button 61 may be configured to generate a signal to rotate the shift lever 10 to select the shift positions in the order of the P position, the R position, the N position, and the D position. The reverse button 62 may be configured to generate a signal to rotate the shift lever 10 to select the shift positions in the order of the D position, the N position, the R position, and the P position.

Figure 4:
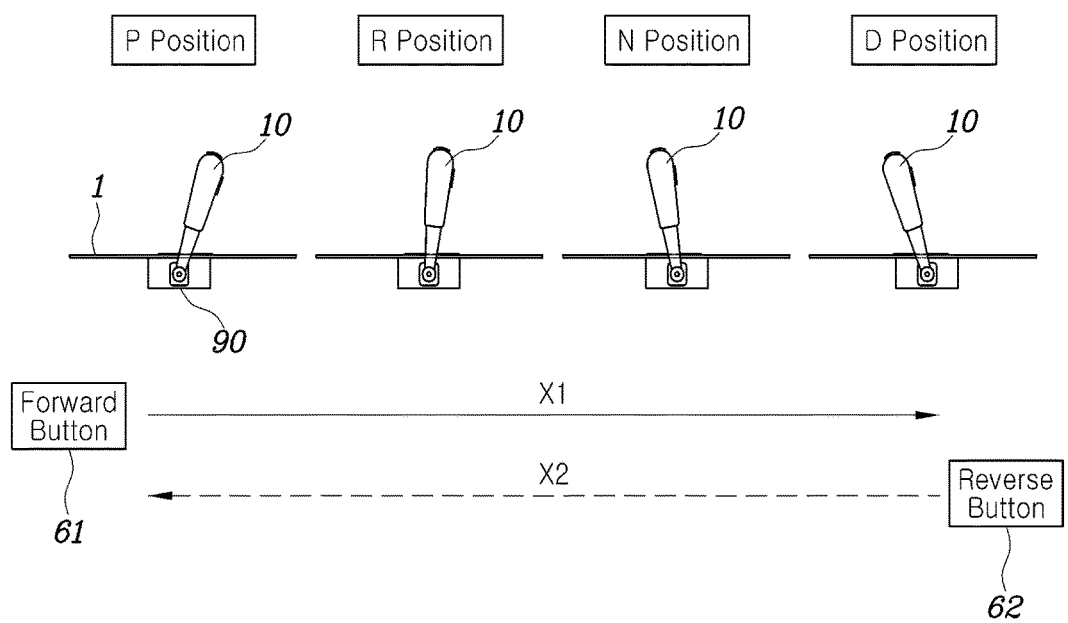
FIG. 4 is a view illustrating positions of a shift lever in response to the manipulation of a rotating button according to an exemplary embodiment of the present invention.
Figure 5:
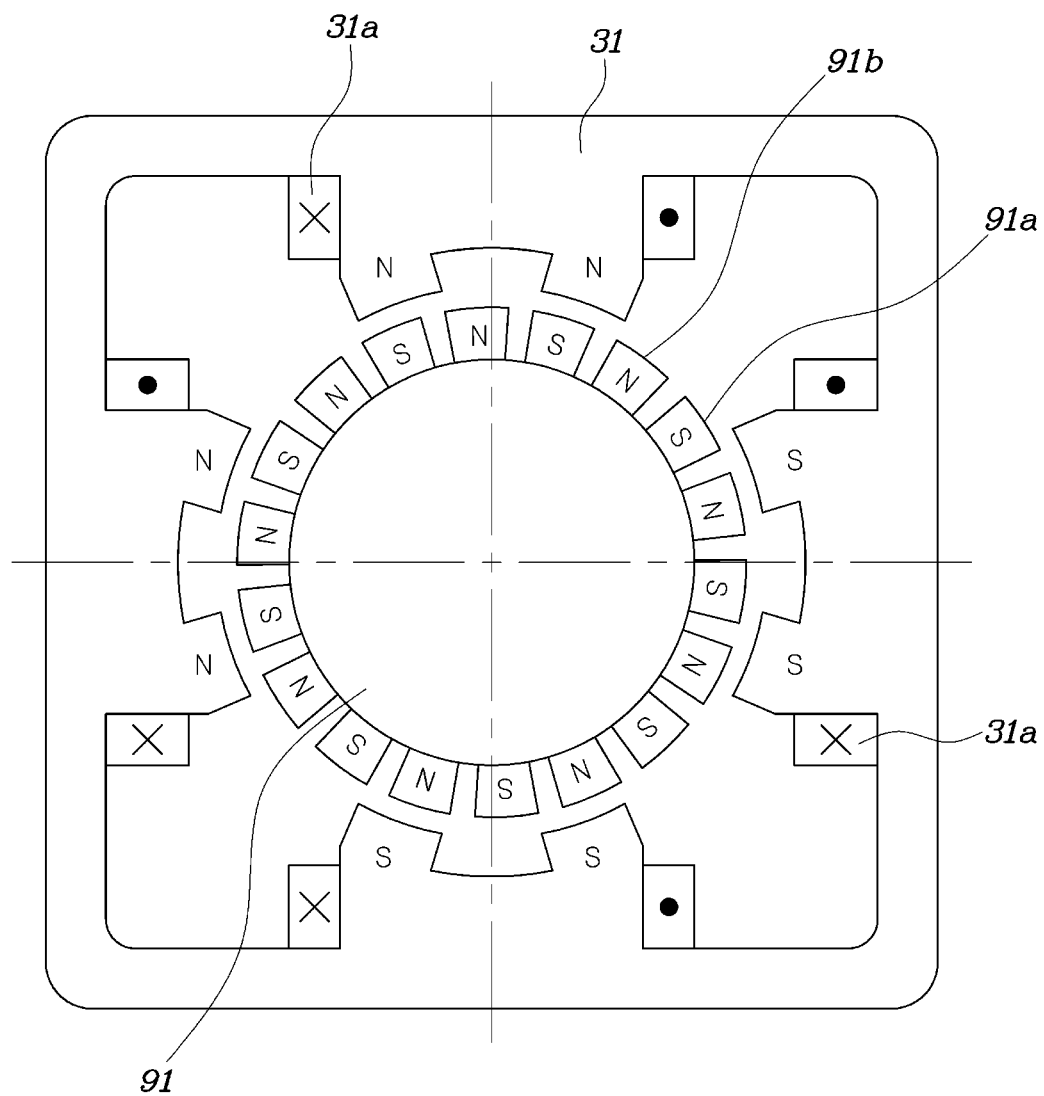
FIG. 5 is a view illustrating a first actuator to an exemplary embodiment of the present invention.

When the forward button 61 is engaged (e.g., pressed), the actuator 30 may be operated by the PCB 50 to rotate a lever rod 90 that will be described hereinafter to rotate the shift lever 10 in the direction from left to right or from right to left to select the shift positions in the order of the P position, the R position, the N position, and the D position (arrow X1 in FIG. 4). In addition, when the reverse button 62 is engaged (e.g., pressed), the first actuator 30 may be operated by the PCB 50 to rotate the shift lever 10 in the direction to select the shift positions are selected in the order of the D position, the N position, the R position, and the P position (arrow X2 in FIG. 4).

When the position of the lever magnet 20 changes based on the rotation of the shift lever 10 in response to manipulation of the rotating button 60, the PCB 50 may be configured to detect a selected shift position based on a value of current that corresponds to a change in magnetic flux. In addition, when the position of the lever magnet 20 changes based on the forward movement of the shift lever 10 in response to the manipulation of the forward button 70 after the manipulation of the rotating button 60 is stopped, the PCB 50 may be configured to output a selected shift position change signal to the TCU using a value of current corresponding to a change in magnetic flux.

The shift lever 10 according to the exemplary embodiment of the present invention may be disposed on a console 1 adjacent to the driver's seat to allow the driver to more easily manipulate the shift lever 10. The upper part of the shift lever 10 used to manipulate the shift lever 10 may protrude into the interior of the cabin through the console 1. The lower part (e.g., portion) of the shift lever 10 may be disposed to be positioned within the console 1 to be engaged with the surrounding components to improve an aesthetic appearance. The console 1 may include a manipulation aperture 1a in which the shift lever 10 is disposed. The shift lever 10 may be configured to rotate and move forwards and backwards within the manipulation aperture 10a without interfering with the shift lever 10.

When the shift lever 10 interferes with the console 1 during the rotation or forward-backward movement thereof, it may be impossible to properly manipulate the shift lever 10. In this regard, the manipulation aperture 1a may be formed in a sufficient size at which the shift lever 10 does not interference with the console 1. In addition, the electronic shift system according to the exemplary embodiment of the present invention may further include a cover member 80 that covers the manipulation aperture 1a. Since the manipulation aperture 1a is covered with the cover member 80, it may be possible to prevent impurities from entering the interior of the console 1 and improve the aesthetic appearance thereof.

The lower part of the shift lever 10 extends through the cover member 80 and the manipulation aperture 1a of the console 1 and the lower part of the shift lever 10 may be positioned within the console 1. The cover member 80 may be movable (e.g., capable of being moved and not a fixed component) following the rotation or linear movement of the shift lever 10. In this regard, the cover member 80 may be disposed on the console 1 in a position in which the cover member 80 is guided thereto or may be magnetically engaged with the console 1. Within the console 1, a support plate 3 may be fixed to the console 1, and the first and second actuators 30 and 40 and the PCB 50 may be fixedly disposed on the support plate 3.

In addition, the electronic shift system according to the exemplary embodiment of the present invention may further include a lever rod 90 and a return spring 100. The lever rod 90 that extends in a forward-backward direction through the lower end portion of the shift lever 10 may be engaged integrally with the shift lever 10 to operate in concert with (e.g., to correspond to) the shift lever 10, and may be connected to the first and second actuators 30 and 40. The leading end portion of the lever rod 90 may extend through the return spring 100, one end (e.g., a first end) of which is supported by the lever rod 90, and the other end (e.g., a second end) of which may be disposed on and supported by a front surface 3a of the support plate 3. When external force applied to the lever rod 90 from the shift lever 10 is removed, the return spring 100 may return the lever rod 90 to the original position by driving the lever rod 90 backwards.

A portion of the lever rod 90 that extends through the first actuator 30 (a section L1 of the lever rod 90 in FIG. 2) may form a rotor part 91 on which permanent S magnets 91a and permanent N magnets 91b may be fixedly disposed. The first actuator 30 may include a stator part 31 on which coils 31a are wound. According to this configuration, the rotor part 91 and the stator part 31 constitute a step motor. The magnetic strength of the rotor part 31 may be changed differently based on the shift positions or the distances between the rotor part 31 and the stator part 91 may be set different based on the shift positions, thereby setting different levels of resistance to the step motor based on the shift positions. Accordingly, the driver may have an improved feeling of control when changing gears.

For example, when the levels of resistance are set to vary based on the rotation of the shift lever 10 causing the resistance to gradually increase when the shift position changes from the P position to the D position while the resistance gradually decreases when the shift position changes from the D position to the P position, the feeling of control occurring when changing gears may prevent the driver from erroneously manipulating the shift positions.

Further, the second actuator 40 may be a solenoid having coils 41, and a rear portion of the lever rod 90 fitted into the solenoid (a section L2 of lever rod 90 in FIG. 2) may be formed of a steel material. When an electrical connection is made in response to the driver manipulating the forward button 70, the supply of current to the solenoid may be terminated or cut off. Particularly, the lever rod 90 may be in the released position in which the lever rod 90 is movable forwards. When the driver stops manipulating the forward button 70, current may be supplied to the solenoid, and the solenoid may be magnetized, whereby the lever rod 90 may be restrained to prevent the lever rod 90 from moving forwards. In the electronic shift system according to the exemplary embodiment of the present invention, when both the rotating button 60 and the forward button 70 are in off positions (e.g., disengaged), both the first and second actuators 30 and 40 may remain in the locked positions under the control of the PCB 50. Accordingly, both the rotation and the forward movement of the shift lever 10 may be restrained.

The locked position of the first actuator 30, i.e. the fixed position of the step motor, may indicate that the magnetized polarity of the stator part 31 remains fixed without changing as the magnetism generated by the coils 31a is not changed. The rotation of the lever rod 90 may be restrained since the rotor part 91 may be prevented from rotating. Furthermore, when the driver applies force to the shift lever 10, the shift lever 10 may remain in the restrained position without rotating.

In addition, the locked position of the second actuator 40 may indicate a position in which the solenoid magnetized in response to current being supplied to the coils 41 of the second actuator 40 restrains the rear portion L2 of the lever rod 90 to prevent the lever rod 90 from moving. In this position, the movement of the rotor part 91 may be restrained, to restrain the forward movement of the lever rod 90. Furthermore, when the driver applies force to the shift lever 10, the shift lever 10 may remain in the restrained position without rotating. When the rotating button 60 is in an on position and the forward button 70 is in an off position, the first actuator 30 may be operated by the PCB 50. Consequently, the shift lever 10 may be configured to rotate and the second actuator 40 may remain in the locked position, whereby the forward movement of the shift lever 10 may be restrained.

From the moment when the rotating button 60 is manipulated to the on position by the driver, the polarity of current supplied to the coils 31a under the control of the PCB 50 may be changed, and thus the magnetized polarity of the stator part 31 may be changed. Thus, the rotor part 1 may be configured to rotate, causing the lever rod 90 to rotate. Furthermore, the shift lever 10 may be configured to rotate in the transverse direction, to allow one shift position among the P position, the R position, the N position, and the D position to be selected. When the rotating button 60 is in an off position and the forward button 70 is in an on position, the first actuator 30 may be configured to restrain the rotation of the shift lever 10 by remaining in the locked position under the control of the PCB 50, and the second actuator 40 may be in a released position in response to the supply of current being terminated, allowing the shift lever 10 to move forwards.

Additionally, from the moment when the forward button 70 is manipulated to the on position by the driver, the supply of current to the coils 41 may be terminated by the PCB, thus causing the solenoid to be demagnetized. Accordingly, the shift lever 10 may be moved forwards by force applied thereto by a driver. In addition, when force applied to the shift lever 10 is removed, the shift lever 10 may move backwards under the elastic force of the return spring 100, thereby returning to the original position. When both the rotating button 60 and the forward button 70 are in on positions, the PCB 50 may be configured to detect an erroneous manipulation, and may be configured to operate both the first actuator 30 and the second actuator 40 to be locked, thereby realizing a shift lock position.

Further, the electronic shift system according to the exemplary embodiment of the present invention may further include a display part 110 operated by the controller to display a warning signal based on the current shift position and the error signal output from the PCB 50. In particular, the shift lever 10 may be automatically moved forwards using the solenoid of the second actuator 40. In this regard, the solenoid may be configured to include a plunger engaged with the rear end of the lever rod 90. The second actuator 40 may be disposed such that the plunger protrudes forward.

When the forward button 70 is manipulated to the on position by the driver, the solenoid may be operated by the PCB 50 to cause the plunger to protrude, whereby the lever rod 90 moves forwards. When the configuration of automatically moving the shift lever 10 forwards using the solenoid is provided as described above, it may be possible to adjust a speed at which the plunger protrudes and a speed at which the lever rod 90 moves by adjusting the strength of current applied to the solenoid. Thus, it may be possible to increase the speed at which the lever rod 90 moves in sport mode and parking mode and decrease the speed at which the lever rod 90 moves in deluxe mode to allow the driver to enjoy a more refilled driving experience.

Hereinafter, the operation of the embodiment of the present invention will be described.

Figure 6:
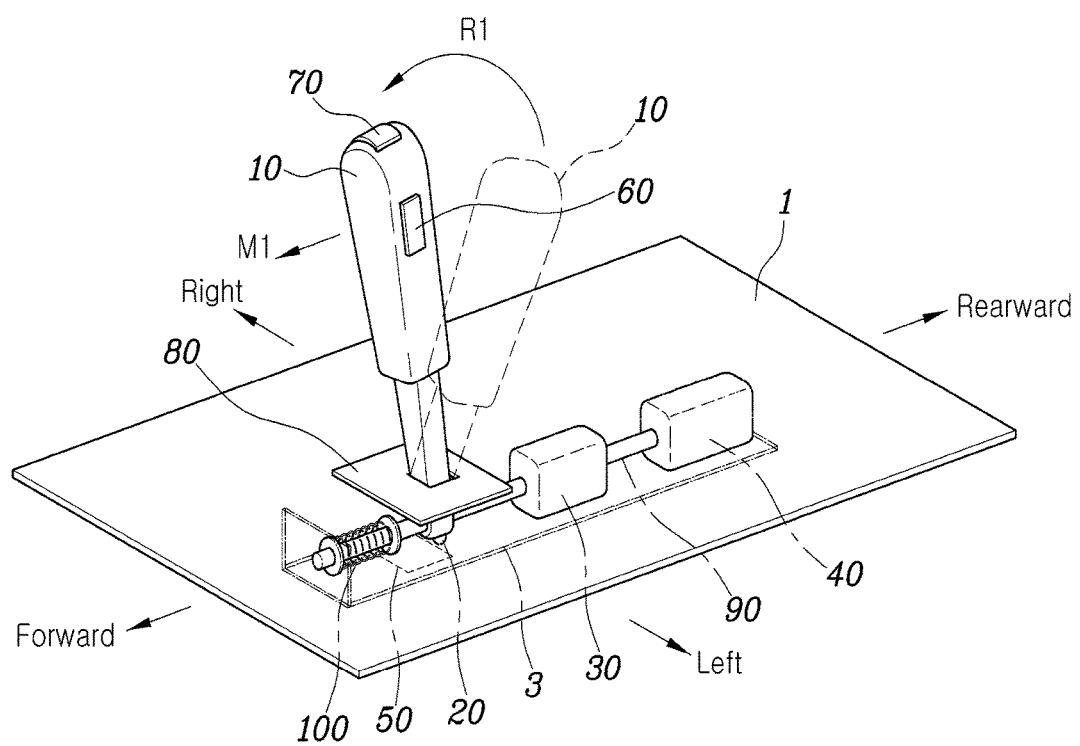
FIG. 6 is a view illustrating the operation of the electronic shift system according to an exemplary embodiment of the present invention.

Referring to FIG. 6, the shift lever 10 illustrated with dotted lines is in the P position to indicate the parking state of the vehicle. The shift lever 10 in the P position may remain in the restrained position in which the shift lever 10 may neither rotate nor move forwards unless the driver manipulates the rotating button 60 or the forward button 70. The shift lever 10 drawn with solid lines in FIG. 6 is in the D position. The driver may primarily manipulate the rotating button 60 or the forward button 61 to manipulate the shift lever 10 to change gears.

When the forward button 61 is manipulated, an electrical signal is transferred to the PCB 50. The first actuator 30 may be operated by the PCB 50, and the lever rod 90 axially may be configured to rotate in response to the operation of the first actuator 30. The shift lever 10 may be configured to rotate by the axial rotation of the lever rod 90 (arrow R1 in FIG. 6). When the forward button 61 is manipulated once, the lever magnet 20 engaged with the lower end of the shift lever 10 may move from the P position to the R position, and finally may move to the D position in response to repeated manipulations.

When the driver manipulates the rotating button 60, and the forward button 70 is not manipulated, the shift lever 10 may be configured to rotate transversely, and the forward movement may be restrained by the second actuator 40. When the lever magnet 20 rotates to the D position, the PCB 50 may be configured to detect a selected shift position based on a value of current that corresponds to a changed magnetic flux following a change in the position of the lever magnet 20. When the selection of the shift position is completed as described above, the driver finishes manipulating the rotating button 60. From this moment, the shift lever 10 may remain in the restrained position in which the shift lever 10 is prevented from rotating.

After completing the manipulation of the rotating button 60, the driver manipulates the forward button 70. In response to the forward button 70 being manipulated, an electrical signal may be transferred to the PCB 50, which in turn may cause the operation of the second actuator 40. Following the operation of the second actuator 40, the lever rod 90 may be released from the restrained position. Thus, the shift lever 10 may be moved forwards by force from the driver. When the driver moves the shift lever 10 forwards (arrow M1), the position of the lever magnet 20 changes, and the PCB 50 may be configured to output a selected shift position change signal to the TCU based on the value of current that corresponds to a change in magnetic flux. The solenoid or the electric motor may be configured to operate in response to an electric signal instructed by the TCU. Further, in response to the operation of the solenoid or the electric motor, hydraulic pressure may be induced in a corresponding shift position or may be prevented from being induced therein, whereby electronic shift control may be executed.

When the force applied from the driver to the shift lever 10 that has moved forwards is removed, the lever rod 90 and the shift lever 10 may return backwards (in the direction opposite to the arrow M1) under the restoring force of the return spring 100. When a predetermined period of time (e.g., about 2 seconds) has elapsed without the manipulation of the rotating button 60, the second actuator 40 may be operated by the PCB 50 to convert the returned shift lever 10 into the restrained position in which the shift lever 10 may be prevented from moving forwards. In addition, the restrained position in which the shift lever 10 is prevented from rotating may be continuously maintained by the first actuator 43 operated by the PCB 50. After the operation of changing from the D position to another position and the cruising are completed, the shifting operation to the P position may be the same as described above, and thus descriptions thereof will be omitted.

As set forth above, the electronic shift system according to the exemplary embodiment of the present invention may be configured to execute the gear-changing operation to a target shift position by the rotation and the forward movement of the shift lever. The electronic shift system may stimulate a driver's interest in the gear-changing operation, thereby improving the marketability thereof. In particular, the reliability of the gear-changing operation may be improved, thereby preventing an erroneous manipulation. In addition, the stroke in the manipulation of the shift lever 10 may be minimized, thereby significantly reducing the fatigue of the driver regarding the gear-changing operation.

Although an exemplary embodiment of the present invention has been described for illustrative purposes, those skilled in the art will appreciate that various modifications, additions and substitutions are possible, without departing from the scope and spirit of the present invention as disclosed in the accompanying claims.

What is claimed is:
1. An electronic shift system, comprising:
    a shift lever having an upper end movable in a transverse direction with respect to a lower end thereof, or having an entire body movable forwards or backwards with respect to the lower end thereof;
    a lever magnet engaged with the lower end of the shift lever;
    a first actuator connected to the shift lever to restrain the shift lever from rotating transversely or to release the shift lever from a restrained position;
    a second actuator connected to the shift lever to restrain the shift lever from moving forwards or backwards or to release the shift lever from a restrained position;
    a printed circuit board (PCB) disposed facing the lever magnet and configured to detect shift positions in response to changes in a position of the lever magnet, output a shift position signal of a detected shift position to a transmission control unit (TCU), and operate the first actuator and an operation of the second actuators; and a forward button disposed on an upper portion of the shift lever, wherein the forward button is configured to output a forward movement signal of the shift lever in response to an electrical connection based on a driver manipulation.

2. The electronic shift system according to claim 1, further comprising:

a rotating button disposed on the upper portion of the shift lever, wherein the rotating button is configured to output a transverse rotation signal of the shift lever in response to the electrical connection based on the driver manipulation.

3. The electronic shift system according to claim 2, wherein the shift positions selected when the shift lever rotates in response to the rotating button being manipulated are a parking position (P), a reversing position (R), a neutral position (N), and a driving position (D), and wherein the rotating button includes a forward button configured to generate a signal to rotate the shift lever to select the shift positions in the order of the parking position, the reversing position, the neutral position, and the driving position and a reverse button configured to generate a signal to rotate the shift lever to select the shift positions in the order of the driving position, the neutral position, the reversing position, and the parking position.

4. The electronic shift system according to claim 1, wherein, when a position of the lever magnet changes following rotation of the shift lever in response to the rotating button being manipulated, the PCD is configured to detect a selected shift position based on a value of current that corresponds to a change in magnetic flux, and when the position of the lever magnet changes following a forward movement of the shift lever in response to manipulation of the forward button after manipulation of the rotating button is stopped, the PCB is configured to output a selected shift position change signal to the TCU using a value of current that corresponds to a change in magnetic flux.

5. The electronic shift system according to claim 1, wherein the shift lever is disposed on a console adjacent to a driver seat to allow manipulation of the shift lever, an upper part of the shift lever protrudes into an interior of a cabin through the console, a lower part of the shift lever being disposed to be positioned within the console.

6. The electronic shift system according to claim 5, wherein the console includes a manipulation aperture, wherein the shift lever is configured to rotate and move forwards and backwards within the manipulation aperture without interfering with the shift lever, the electronic shift system further comprising a cover member that covers the manipulation aperture, wherein the cover member is disposed on the console in a position in which the cover member is guided thereto or is magnetically engaged with the console to allow the cover member to be moved together with the shift lever.

7. The electronic shift system according to claim 5, wherein the console includes a support plate fixedly disposed therein, and the first and second actuators and the PCB are fixedly disposed on the support plate.

8. The electronic shift system according to claim 7, further comprising:

a lever rod that extends in a forward-backward direction through the lower end portion of the shift lever, wherein the lever rod is engaged integrally with the shift lever to operate in cooperation with the shift lever, and is connected to the first and second actuators.

9. The electronic shift system according to claim 8, further comprising:

a return spring and a leading end portion of the lever rod extends through the return spring, wherein a first end of the return spring is supported by the lever rod, and a second end of the return spring is disposed on and supported by a front surface of the support plate, and wherein, when external force applied to the lever rod from the shift lever is removed, the return spring returns the lever rod to an original position by driving the lever rod backwards.

10. The electronic shift system according to claim 8, wherein a portion of the lever rod extending through the first actuator forms a rotor part on which permanent S magnets and permanent N magnets are fixedly disposed, and the first actuator includes a stator part on which coils are wound, wherein the rotor part and the stator part constitute a step motor.

11. The electronic shift system according to claim 10, wherein magnetic strengths of the rotor part are changed differently based on the shift positions or the distances between the rotor part and the stator part are set different based on the shift positions, to set different levels of resistance of the step motor based on the shift positions, to provide the driver with a control feeling when changing gears.

12. The electronic shift system according to claim 8, wherein the second actuator includes a solenoid, when an electrical connection is made in response to the manipulation of the forward button, supply of current to the solenoid is terminated and the lever rod is in a released position in which the lever rod is movable forwards, and the manipulation of the forward button terminates, current is applied to the solenoid, to restrain the lever rod to prevent the lever rod from moving forwards.

13. The electronic shift system according to claim 8, wherein, when both the rotating button and the forward button are in off positions, both the first and second actuators remain in locked positions and both a rotation and a forward movement of the shift lever are restrained.

14. The electronic shift system according to claim 8, wherein, when the rotating button is in an on position and the forward button is in an off position, the first actuator is operate to rotate the shift lever and the second actuator remains in a locked position, to restrain a forward movement of the shift lever.

15. The electronic shift system according to claim 8, wherein, when the rotating button is in an off position and the forward button is in an on position, the first actuator is configured to restrain a rotation of the shift lever by remaining in a locked position, and the second actuator is in a released position in response to supply of current being stopped, to allow the shift lever to move forwards.

16. The electronic shift system according to claim 8, wherein, when both the rotating button and the forward button are in on positions, the PCB is configured to detect an erroneous manipulation, and operate both the first actuator and the second actuator to be locked.

17. The electronic shift system according to claim 1, further comprising:
   a display part configured to display a warning signal based on a current shift position and an error signal output from the PCB.

\* \* \* \* \*